United States Patent
La Vietes et al.

(10) Patent No.: US 8,178,449 B2
(45) Date of Patent: May 15, 2012

(54) FIRE RESISTANT SLIPSHEET

(75) Inventors: Daniel La Vietes, Dallas, TX (US); Michael Lee Bryson, Independence, MO (US)

(73) Assignee: Building Materials Investment Corp., Wilmington, DE (US)

( * ) Notice: Subject to any disclaimer, the term of this patent is extended or adjusted under 35 U.S.C. 154(b) by 269 days.

(21) Appl. No.: 12/505,278

(22) Filed: Jul. 17, 2009

(65) Prior Publication Data

US 2011/0011021 A1    Jan. 20, 2011

(51) Int. Cl.
    B32B 5/02    (2006.01)
(52) U.S. Cl. .......... 442/136; 428/921; 52/408; 52/741.3
(58) Field of Classification Search ............ 52/408, 52/741.3; 428/317.7, 323, 920, 921; 442/64, 442/71, 72, 136, 138
    See application file for complete search history.

(56) References Cited

U.S. PATENT DOCUMENTS

| | | | |
|---|---|---|---|
| 4,746,565 A * | 5/1988 | Bafford et al. ............... 442/243 |
| 4,795,776 A * | 1/1989 | Milner ............................. 524/386 |
| 4,992,315 A * | 2/1991 | Zickell et al. ................ 428/40.3 |
| 5,110,413 A | 5/1992 | Steer |
| 5,176,863 A | 1/1993 | Howard |
| 5,384,188 A * | 1/1995 | Lebold et al. ................ 442/414 |
| 5,443,894 A | 8/1995 | Pollock et al. |
| 5,523,059 A | 6/1996 | Langer |
| 5,570,553 A * | 11/1996 | Balkins ............................ 52/518 |
| 5,830,319 A * | 11/1998 | Landin ............................ 162/159 |
| 5,955,386 A * | 9/1999 | Horton ............................ 442/138 |
| 5,965,257 A * | 10/1999 | Ahluwalia ..................... 428/357 |
| 5,968,669 A | 10/1999 | Liu et al. |
| 6,084,008 A | 7/2000 | Liu |
| 6,153,668 A | 11/2000 | Gestner et al. |
| 6,410,137 B1 | 6/2002 | Bunyan |
| 6,586,353 B1 * | 7/2003 | Kiik et al. ..................... 442/320 |
| 7,294,363 B2 | 11/2007 | Grove, III et al. |
| 7,331,400 B2 | 2/2008 | Rowen |
| 7,351,469 B2 | 4/2008 | Beck et al. |
| 2002/0081924 A1 * | 6/2002 | Fensel et al. .................. 442/180 |
| 2003/0061768 A1 * | 4/2003 | Longcor et al. .................... 52/5 |
| 2003/0176125 A1 * | 9/2003 | Ahluwalia ........................ 442/59 |
| 2003/0224679 A1 * | 12/2003 | Ahluwalia ........................ 442/72 |
| 2004/0197468 A1 | 10/2004 | Geel et al. |
| 2005/0066620 A1 * | 3/2005 | Albora ........................... 52/782.1 |
| 2005/0139126 A1 | 6/2005 | Khan et al. |
| 2005/0145139 A1 | 7/2005 | Khan et al. |
| 2007/0068109 A1 * | 3/2007 | Swann ............................. 52/518 |

(Continued)

FOREIGN PATENT DOCUMENTS

JP    2004224960 A * 8/2004

*Primary Examiner* — Brian Glessner
*Assistant Examiner* — Adriana Figueroa
(74) *Attorney, Agent, or Firm* — Baker Botts LLP

(57) ABSTRACT

A fire resistant slipsheet in roll form includes a fiber mat having first and second sides and a coating containing expandable graphite, a filler, and a binder. The coating is coated on at least one of the first and second sides of the fiber mat, and a single layer of the slipsheet achieves a Class A rating when tested according to UL 790 and/or ASTM E-108 Standard Test Methods for Fire Tests of Roof Coverings. A fire resistant roofing system and a method for installing a fire resistant roofing system that achieves a Class A rating when tested according to UL 790 and/or ASTM E-108 Standard Test Methods for Fire Tests of Roof Coverings is also provided.

36 Claims, 4 Drawing Sheets

U.S. PATENT DOCUMENTS

| | | | |
|---|---|---|---|
| 2008/0102243 A1* | 5/2008 | Gupta | 428/41.8 |
| 2008/0157036 A1 | 7/2008 | Ogawa et al. | |
| 2008/0196344 A1 | 8/2008 | Chang et al. | |
| 2008/0224105 A1 | 9/2008 | Green et al. | |
| 2008/0248242 A1* | 10/2008 | Shiao et al. | 428/141 |
| 2008/0250741 A1* | 10/2008 | Bennett et al. | 52/506.01 |
| 2009/0277126 A1* | 11/2009 | Wollert et al. | 52/741.1 |
| 2009/0308009 A1* | 12/2009 | Boor | 52/309.13 |

* cited by examiner

FIRE RESISTANT SLIPSHEET

BACKGROUND OF THE INVENTION

1. Field of the Invention

The present invention generally relates to a fire resistant slipsheet in roll form, a fire resistant roofing system, and a method for installing a fire resistant roofing system. Embodiments of the invention relate to slipsheets that can be used in the roofing industry as fire barriers for protecting buildings and homes.

2. Description of Related Art

Conventionally, there are different types of underlayments and slipsheets used in the roofing industry as fire barriers for protecting buildings and homes. For example, gypsum boards have been used as fire barriers with a ¼" minimum thickness. However, gypsum boards are very heavy, which presents handling and transportation issues on a roof. Additionally, once the gypsum boards are installed, they must be immediately covered with the roof covering because the boards cannot get wet.

Other sheet-type products have been developed to provide fire resistance to buildings and homes such as FR-10 and FR-50 slipsheets manufactured by Atlas Roofing Corp. However, these sheets require the installation of multiple layers in order to achieve the desired fire barrier.

Therefore, there is a need for a fire resistant slipsheet which is not heavy, does not require a labor and time intensive installation, and which achieves the desired fire barrier with a single layer installation.

SUMMARY OF THE INVENTION

The purpose and advantages of the present invention will be set forth in and apparent from the description that follows, as well as will be learned by practice of the invention. Additional advantages of the invention will be realized and attained by the apparatus and methods particularly pointed out in the written description and claims hereof, as well as from the appended drawings.

To achieve these and other advantages and in accordance with the purpose of the invention, as embodied and broadly described, the invention includes a fire resistant slipsheet in roll form. The slipsheet can be used as a fire barrier in roofing installations, as well as any other suitable applications. The fire resistant slipsheet in roll form includes a fiber mat having first and second sides and a coating containing expandable graphite, a filler, and a binder. The coating is coated on at least one of the first and second sides of the fiber mat, and a single layer of the slipsheet achieves a Class A rating when tested according to UL 790 and/or ASTM E-108 Standard Test Methods for Fire Tests of Roof Coverings.

In accordance with one aspect of the invention, the expandable graphite can be expandable graphite flakes. The coating optionally includes a flame retardant, and the flame retardant can be aluminum trihydrate. The coating can be coated on both of the first and second sides of the fiber mat. Furthermore, the filler can be selected from the group consisting of fly ash, limestone, calcium carbonate, dolomite, talc, silica, ceramic microspheres, clay, crushed rock or slag, expanded rock (clay, slate, or shale), and mixtures thereof. The binder can be a polymer latex binder.

The coating of the fire resistant slipsheet can further include at least one material selected from the group consisting of a water repellent material, an anti-fungal material, an anti-bacterial material, a surface friction agent, an algaecide, a thickener, a defoamer, a pH control agent, and colored pigments. A single layer of the slipsheet achieves a Class A rating for both steep slope and low slope roofing systems when tested according to UL 790 and/or ASTM E-108 Standard Test Methods for Fire Tests of Roof Coverings.

In accordance with another aspect of the invention, a fire resistant roofing system is provided. The fire resistant roofing system includes a deck, a substantially single layer of a slipsheet material covering substantially the entirety of the deck, and a roof covering covering substantially the entirety of the slipsheet. The single layer slip sheet includes a fiber mat having first and second sides and a coating containing expandable graphite, a filler, and a binder. The coating is coated on at least one of the first and second sides of the fiber mat, and the roofing system achieves a Class A rating when tested according to UL 790 and/or ASTM E-108 Standard Test Methods for Fire Tests of Roof Coverings.

In a preferred embodiment, the coating is coated on the first side of the fiber mat and the roof covering covers the first side of the fiber mat. The roof covering can be shingles, a single ply membrane, or other suitable roof coverings. The roofing system achieves a Class A rating for both steep slope and low slope roofing systems when tested according to UL 790 and/or ASTM E-108 Standard Test Methods for Fire Tests of Roof Coverings. The roofing system can optionally include an insulation layer. Furthermore, the slipsheet can include any of the properties described above.

In accordance with another aspect of the invention, a method for installing a fire resistant roofing system that achieves a Class A rating when tested according to UL 790 and/or ASTM E-108 Standard Test Methods for Fire Tests of Roof Coverings is provided. The method includes providing a deck, unrolling and installing a substantially single layer of a slipsheet material over substantially the entirety of the deck, and installing a roof covering over substantially the entirety of the slipsheet. The slipsheet includes a fiber mat having first and second sides and a coating containing expandable graphite, a filler, and a binder. The coating is coated on at least one of the first and second sides of the fiber mat.

In a preferred embodiment, the coating is coated on the first side of the fiber mat and the roof covering is installed over the first side of the fiber mat. The roof covering can be shingles, a single ply membrane, or other suitable coverings. The fire resistant roofing system achieves a Class A rating for both steep slope and low slope roofing systems when tested according to UL 790 and/or ASTM E-108 Standard Test Methods for Fire Tests of Roof Coverings. The method can also include providing an insulation layer. Furthermore, the slipsheet can include any of the properties described above.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the apparatus and method of the invention. Together with the written description, the drawings serve to explain the principles of the invention.

DETAILED DESCRIPTION OF THE PREFERRED EMBODIMENT

Reference will now be made in detail to the present preferred embodiments of the invention, an example of which is illustrated in the accompanying drawings. The method and corresponding steps of the invention will be described in conjunction with the detailed description of the apparatus.

The apparatus and methods presented herein generally are intended for a slipsheet for providing a fire barrier to protect buildings and homes, although other similar or suitable uses are contemplated. One aspect of the invention is particularly suited for providing a fire resistant slipsheet in roll form which is light weight, allows for easy and quick installation, and achieves desired fire barrier with a substantially single-layer installation. Thus, in accordance with the invention, a fire resistant slipsheet in roll form is provided. The fire resistant slipsheet in roll form includes a fiber mat having first and second sides and a coating containing expandable graphite, a filler, and a binder. The coating is coated on at least one of the first and second sides of the fiber mat, and a single layer of the slipsheet achieves a Class A rating when tested according to UL 790 and/or ASTM E-108 Standard Test Methods for Fire Tests of Roof Coverings.

Figure 1:
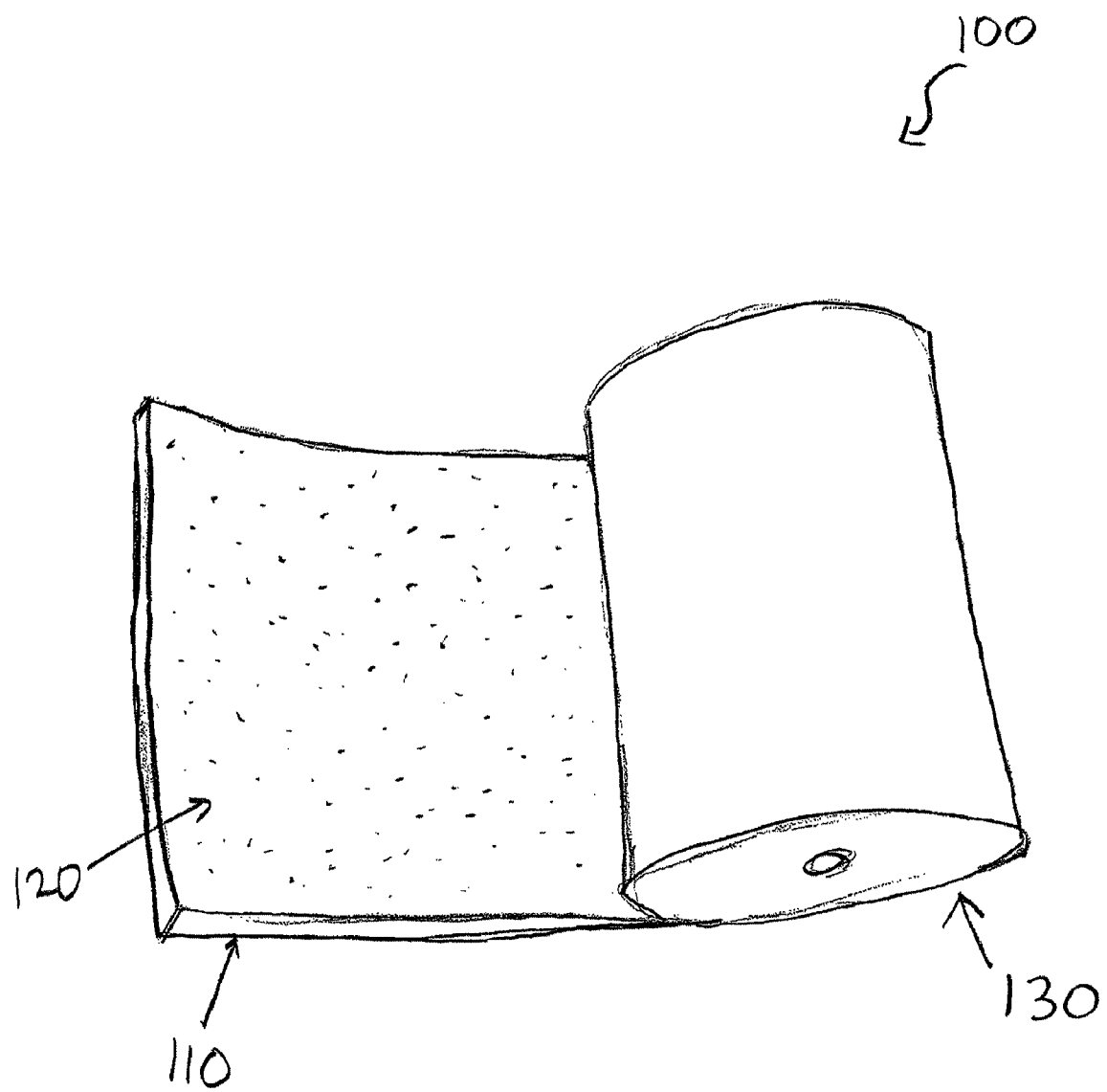
FIG. 1 is top view of a representative embodiment of a slip sheet in accordance with the invention.
Figure 2B:
FIG. 2B is the same section of slip sheet of FIG. 2A after a flame has been applied and the graphite expanded.
Figure 2A:
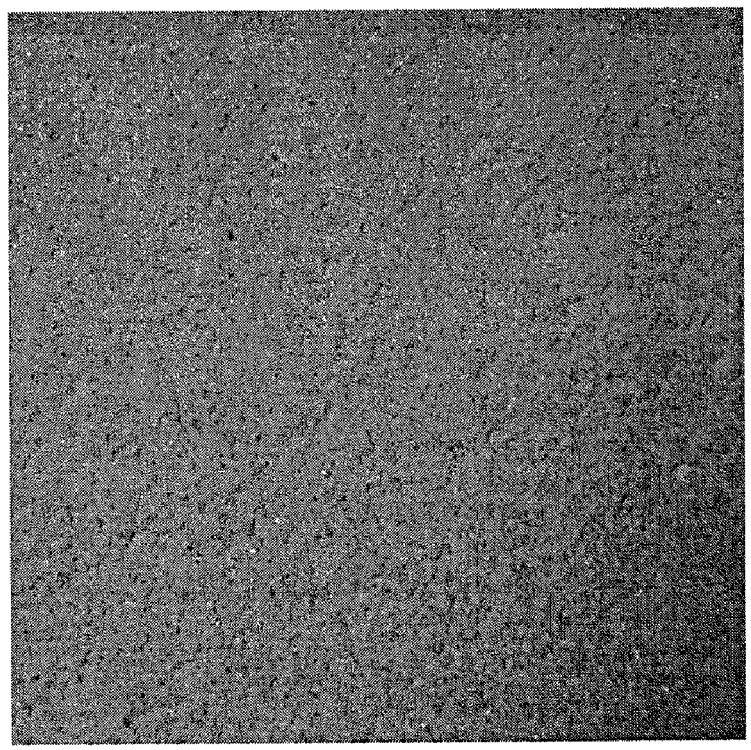
FIG. 2A is a top view of a small section of the top view of the slip sheet of FIG. 1.

For purpose of explanation and illustration, and not limitation, an exemplary embodiment of the fire resistant slipsheet in accordance with the invention is shown in FIGS. 1 and 2 and is designated generally by reference character 100.

FIG. 1 shows an embodiment of a fire resistant slipsheet 100 in accordance with the invention. The fire resistant slip sheet in roll from includes a fiber mat 110 having first and second sides. Preferably, the fiber mat in accordance with the invention can be any woven or non-woven web of glass fibers held together with a binder. For example, but without limitation, one suitable glass fiber mat is the 62185T Glass Mat, available from GAF-Elk Corporation, Ennis, Tex. Additionally or alternatively, the fiber mat can include fibers other than glass, such as cotton, polyester, nylon, acrylic, wool, polyolefins, metal, or other suitable fibers. The fire resistant slip sheet also includes a coating 120 coated on the first side of the fiber mat. As shown in FIG. 1, the fire resistant slip sheet is provided in roll form 130, which allows for ease of storage, transportation and installation.

In accordance with one aspect of the invention, the coating of the slipsheet includes expandable graphite, a filler, and a binder, and is particularly useful for providing a fire barrier. The coating optionally includes a flame retardant. The unique arrangement of the slipsheet in accordance with the invention allows the slip sheet to expand when exposed to a flame. For the purpose of illustration, and without limitation, as shown in FIG. 2B, a protective insulating expanded graphite layer 140 forms when a flame is applied to the slipsheet. The expanded graphite layer can fill air space voids between the slipsheet and the roof covering which has the advantage of closing off air movement and filling the air space with non-flammable insulating material. This arrangement is especially useful when used under metal or other types of shingles that conventionally have airspace between the shingles and the roof deck, since air is required for burning.

As described above, the expandable graphite employed in the coating of the present invention imparts fire-resistance characteristics to the slipsheet. An illustrative example of the expandable graphite employed in the present invention includes, but is not limited to, expandable graphite flakes. Additionally, a mixture of the expandable graphite with other known intumescent agents could also be used.

In accordance with an aspect of the present invention, the expandable graphite can be formed by treating crystalline graphite, which is composed of stacks of parallel planes of carbon atoms, with intercalants such as sulfuric acid or nitric acid, or by any other method known in the art. Since no covalent bonding exists between the planes of the carbon atoms, the intercalant can be inserted therebetween. This allows the intercalant to be positioned within the graphite lattice. When the intercalated graphite is exposed to heat or flame, the inserted molecules decompose and release gases. The graphite layer planes are forced apart by the gas and the graphite expands, thereby creating a low-density, non-burnable, thermal insulation that can absorb a high percentage of heat. An exemplary expandable graphite is available commercially from, for example, GrafTech under the tradename GrafGuard®.

The preferred heat expandable graphite flakes have "onset" temperatures from about 160° C. to about 230° C. The graphite flakes undergo dramatic expansion upon exposure to heat and flame. More particularly, the volume of the preferred expandable graphite flakes can increase to greater than 80 times their original volume in just a few seconds, which provides an insulating layer, protecting the plywood deck or insulating layer.

In accordance with one aspect of the invention, the expandable graphite is typically present in the coating in an amount from about 10 to about 25 wt. %. More preferably, an amount from about 15 to about 20 wt. % is used. The amount of expandable graphite is based on the wet weight of the coating.

In accordance with another aspect of the invention, the optional flame retardant employed in the coating of the slipsheet may be any suitable flame retardant known in the art. For example, and without limitation, the flame retardant can be selected from the group consisting of aluminum trihydrate, zinc borate, alkali metal silicates, and the like. In a preferred embodiment, the flame retardant is aluminum trihydrate.

In accordance with another aspect of the invention, the filler is selected from the group consisting of fly ash, limestone, calcium carbonate, dolomite, talc, silica, ceramic microspheres, clay, crushed rock or slag, expanded rock (clay, slate, or shale), mixtures thereof, and other suitable materials. The filler should be selected to meet desired cost and weight criteria. In a preferred embodiment, the filler is calcium carbonate. Alternatively, the filler may be class F fly ash wherein 90% to 95% by weight of the fly ash is aluminosilicate. Such a fly ash, known as Alsil O4TR, is produced by Headwaters Resources of Jewett, Tex. Calcium carbonate and fly ash filler increase the weight of the product, but utilization of ceramic microspheres enables the manufacture of a product with reduced weight and increased fire resistant properties. Ceramic microspheres can withstand heat greater than 2000° F.

In accordance with another aspect of the invention, the binder employed in the coating of the slipsheet is any thermoplastic polymer or thermoplastic rubber that is capable of forming a film upon curing. In a preferred embodiment, a polymeric binder is employed in the present invention. Preferably, the polymeric binder is in latex form. Suitable polymeric binders employed in the coating of the present invention include, but are not limited to: acrylic or methacrylic polymers or copolymers, epoxy resins, polyvinyl acetate resins and thermoplastic rubbers such as styrene-butadiene rubbers, styrene-butadiene-styrene rubbers, styrene-ethylene-butadiene-styrene (SEBS) rubbers, styrene isoprene styrene (SIS) rubbers, neoprene, and styrene butadiene rubbers (SBR). Urethane is another type of polymeric binder that can be employed in the present invention. In some embodiments, thermoplastic polymers, especially acrylic polymers or copolymers are employed as the polymeric binder of the coating of the present invention. In other embodiments, a thermoplastic rubber such as SEBS is employed as the polymeric binder.

The polymeric binder component of the coating is typically present in the resultant mixture in an amount from about 5 to about 20 wt. %. The actual amount is dependent on the type of binder selected.

In accordance with one embodiment, the coating of the slipsheet may also include other optional components that are typically employed in coating compositions. For example, the coating composition of the present invention can include any of the following components or any combinations thereof: a water repellent material, an anti-fungal material, an anti-bacterial material, a surface friction agent, an algaecide, colored pigments, dispersants such as potassium triphosphosphate, acrylic polymers or copolymers, and the like, defoamers that are capable of preventing foaming, solvents that are capable of serving as a coalescing agent such as ethylene glycol, propylene glycol, alcohols, and the like, microbiocides that serve as fungicides, e.g., zinc oxide, thickening agents such as hydroxethyl cellulose, polyurethane, and the like, pH modifiers such as aqueous ammonia and hydrated lime, wetting agents such as arylalkylpolyethylene oxides, light stabilizers such as hindered amines; and adhesion promoters such as hydrocarbon resins. The optional components mentioned above are present in the coating of the slipsheet in accordance with the present invention in amounts that are well known to those skilled in the art.

In accordance with another aspect of the invention, the coating is coated on at least one of the first and second sides of the fiber mat. Alternatively or additionally, the coating can be coated on both of the first and second sides of the fiber mat or within the fiber mat. The fiber mat may be coated by spraying, dip coating, knife coating, roll coating, blade coating or by printing, such as rotary screen printing. The coating may be bonded to the fiber mat by chemical bonding, mechanical bonding and/or thermal bonding. Mechanical bonding is achieved by feeding a puddle of the coating onto the fiber mat with a knife and forcing penetration into the mat with a knife.

In accordance with another aspect of the invention, there are primarily two types of roofing installations: low slope and steep slope. Low slope commonly describes a roof having an incline of 14° (25% or 3 in/ft) or less. Steep slope commonly describes a roof having an incline of 14° (25% or 3 in/ft) or more. It is intended that the slipsheet herein can be used on both types of roof installations. A single layer of the slipsheet in accordance with the invention achieves a Class A rating for both steep slope and low slope roofing systems when tested according to UL 790 and/or ASTM E-108 Standard Test Methods for Fire Tests of Roof Coverings.

In accordance with another aspect of the invention, a fire resistant roofing system is provided. The fire resistant roofing system includes a deck, a substantially single layer of slipsheet material covering substantially the entirety of the deck, and a roof covering covering substantially the entirety of the slipsheet. The slipsheet includes a fiber mat having first and second sides and a coating containing expandable graphite, a filler, and a binder. The coating is coated on at least one of the first and second sides of the fiber mat, and the roofing system achieves a Class A rating when tested according to UL 790 and/or ASTM E-108 Standard Test Methods for Fire Tests of Roof Coverings.

Figure 3:
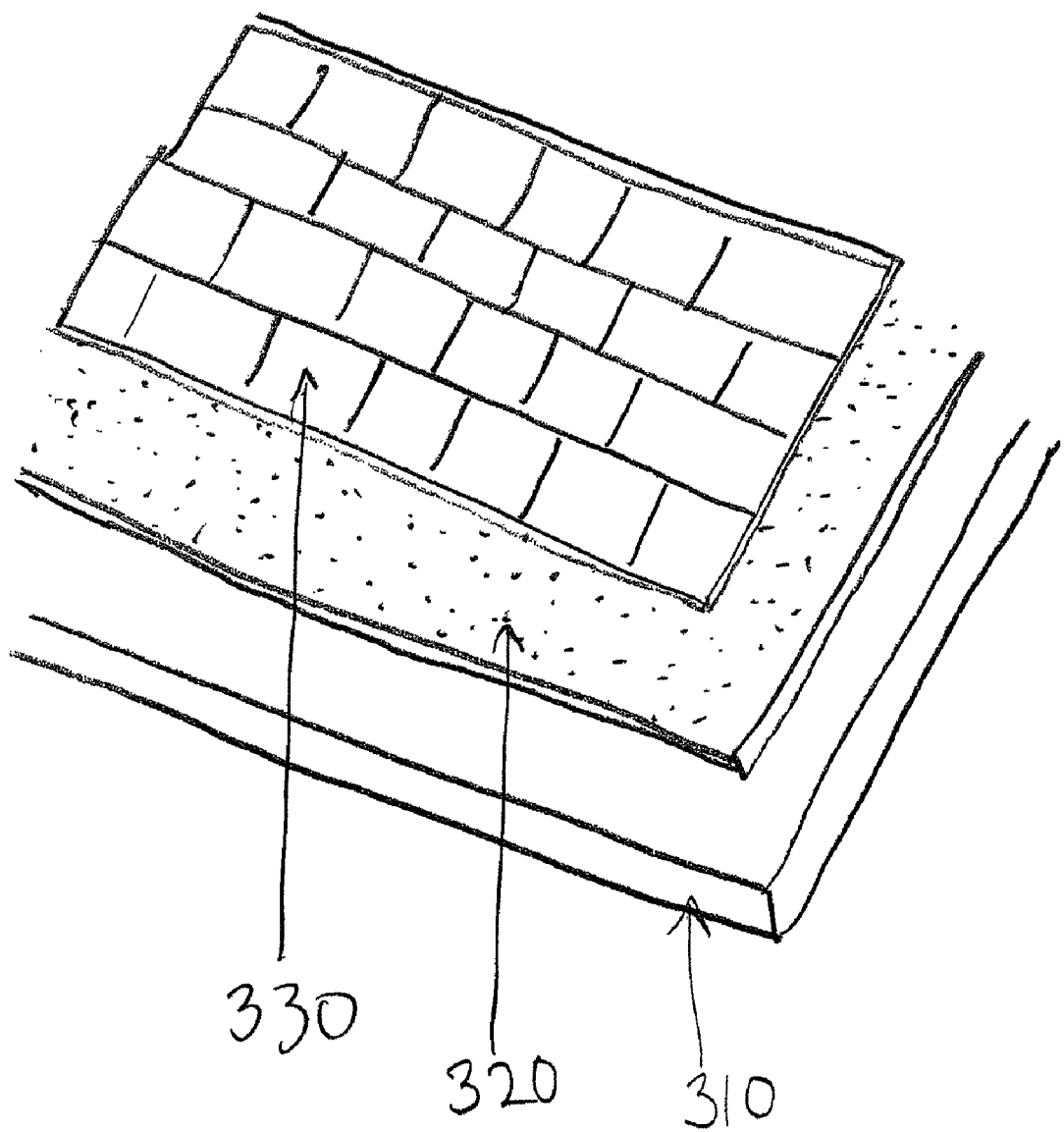
FIG. 3 is a perspective view of a fire resistant roofing system in accordance with the invention.

For purpose of explanation and illustration, and not limitation, an exemplary embodiment of the fire resistant roofing system in accordance with the invention is shown in FIG. 3. As shown in the figure, the roofing system includes a deck 310, a single layer of slipsheet material 320 covering substantially the entirety of the deck, and a roof covering 330 covering substantially the entirety of the slipsheet. The single layer slip sheet 320 includes a fiber mat and a coating. In a preferred embodiment, the coating is coated on the first side of the fiber mat and the roof covering 330 covers the first side of the fiber mat.

In accordance with one aspect of the invention, the deck can be any suitable deck known in the art. For example, the deck can be any combustible deck known, such as plywood, OSB, or other woods. However non-combustible decks are also contemplated, such as metal, cement and other suitable non-combustible materials.

In accordance with another aspect of the invention, the roof covering can be any suitable covering known in the art. It is intended that the invention herein can be used on both steep slope and low slope of roofing installations. In one exemplary embodiment, the roof covering is shingles, such as asphalt, metal, wood, or other suitable shingles. Shingles are commonly used in steep slope applications; however use in low slope applications is also possible. In another exemplary embodiment, the roof covering is a single ply membrane such as a CPE, CSM, CSPE, EPDM, NBP, PIB, PVC, TPO, TRE, or other suitable membrane. Single ply membranes are commonly used in low slope applications; however use in steep slope applications is also possible. Other roof coverings include, but are not limited to, metal standing seam, tile, modified bitumen, cap sheets, or any other suitable coverings known in the art. Further, one or more layers of roofing material may be used for the roof covering.

Figure 4:
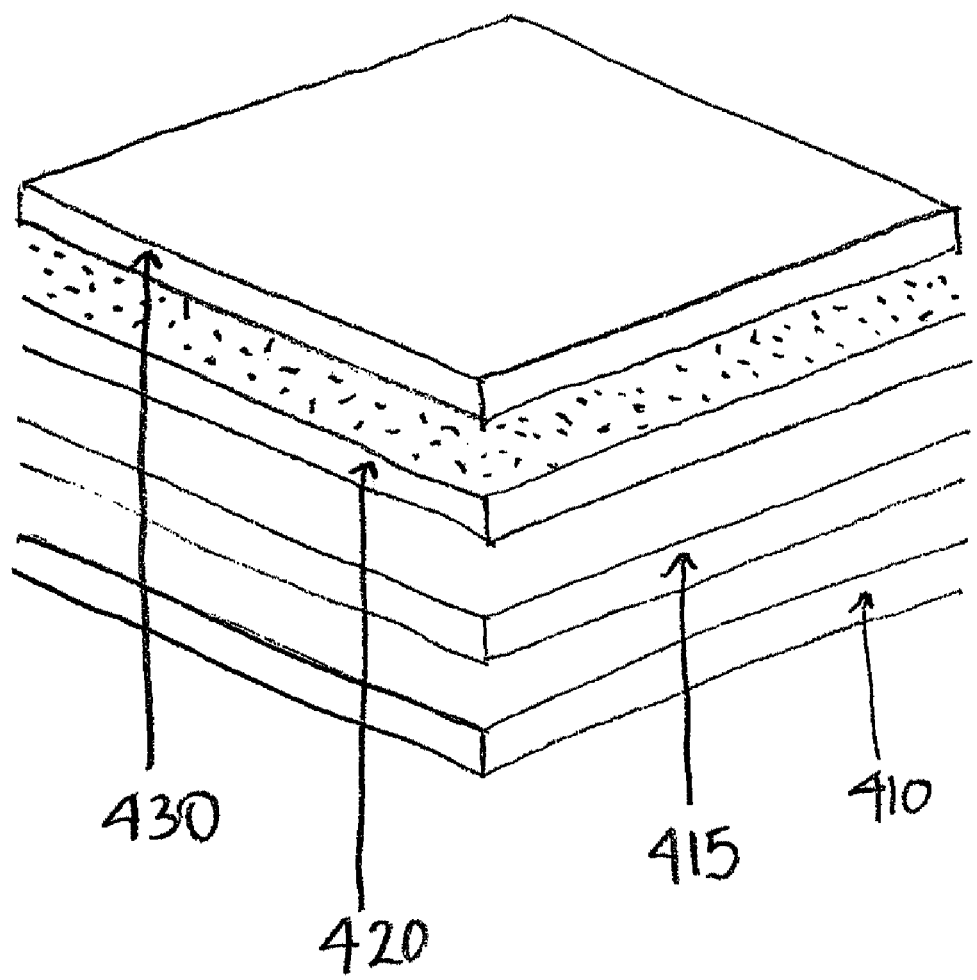
FIG. 4 is a perspective view of a fire resistant roofing system in accordance with another embodiment the invention.

In accordance with one aspect of the invention, the roofing system can optionally further include an insulating layer for any application for which energy efficiency is desired. The insulating layer can be located either above or below slipsheet. For purpose of explanation and illustration, and not limitation, an exemplary embodiment of the fire resistant roofing system including an insulation layer is shown in FIG. 4. As shown in the figure, the roofing system includes a deck 410, an insulating layer 415, a single layer of slipsheet material 420, and a roof covering 430. While the insulating layer 415 is shown below the slipsheet 420 in FIG. 4, the insulating layer could alternatively be located above the slipsheet 420. The insulating layer is most commonly used with low slope roofing systems, however, an insulating layer could also be used in steep slope applications. Exemplary insulation layers include isocyanurate "ISO" board, expandable polystyrene "EPS" board, extruded polystyrene, wood fiber, perlite, and other suitable insulating layer materials.

The slipsheet of the fire resistant roofing system in accordance with the invention can have any of the properties described herein above for the fire resistant slipsheet.

In accordance with another aspect of the invention, a method for installing a fire resistant roofing system that achieves a Class A rating when tested according to UL 790 and/or ASTM E-108 Standard Test Methods for Fire Tests of Roof Coverings is provided. The method includes providing a deck, unrolling and installing a substantially single layer of a slipsheet material over substantially the entirety of the deck, and installing a roof covering over substantially the entirety of the slipsheet. The slipsheet includes a fiber mat having first and second sides and a coating containing expandable graphite, a filler, and a binder. The coating is coated on at least one of the first and second sides of the fiber mat.

In a preferred embodiment, the coating is coated on the first side of the fiber mat and the roof covering is installed over the first side of the fiber mat. The roof covering can be shingles, a single ply membrane, or any other suitable covering known in the art. In one embodiment, the method further includes providing an insulation layer. The insulation layer can be installed above or below the slipsheet and can have any of the properties described above.

In accordance with another aspect of the invention, the slipsheet can be installed on the deck via any known mechanical means, such as by using nails or staples, or adhered to the deck using an adhesive, or other known techniques. Similarly, the insulation layer and roof covering can be installed via known mechanical or adhesive means. Furthermore, the slipsheet utilized in the method for installing the fire resistant roofing system can have any of the properties described herein above for the fire resistant slipsheet.

EXAMPLES

Exemplary compositions of the coating in accordance with the invention are shown in Table 1:

TABLE 1

| Component | Sample A (wt %) | Sample B (wt %) | Sample C (wt %) |
|---|---|---|---|
| Water | 27.8 | 27.8 | 27.8 |
| Acrylic Latex | 9.6 | 9.6 | 9.6 |
| Defoamer | 0.1 | 0.1 | 0.1 |
| Limestone | 44.7 | 34.7 | 24.7 |
| Aluminum Trihydrate | 0.0 | 10.0 | 20.0 |
| Expandable Graphite | 17.5 | 17.5 | 17.5 |
| Hydrated Lime | 0.1 | 0.1 | 0.1 |
| Thickener | 0.2 | 0.2 | 0.2 |

Example 1

Coating Sample B (13.2 lb/100 ft^2, 243 g/m^2) as defined in Table 1 was applied to 62185T Glass Mat, available from GAF-Elk Corporation, Ennis, Tex. The coating was dried in a tunnel oven and wound on a reel. Physical properties of the coated mat are shown in Table 2:

TABLE 2

| Test | Units | Value | Reference |
|---|---|---|---|
| Basis Weight | lb/100 ft^2 | 10.7 | Tappi T-1011 |
| | g/m^2 | 522 | |
| Thickness | mil | 38 | Tappi T-1006 |
| Frazier Porosity | cfm/ft^2 | 10 | ASTM D737 |
| Tensile Strength | lb/1" width | | Tappi T-494 |
| Machine Direction | | 54 | |
| Cross Direction | | 42 | |
| Tear Resistance | gram | | Tappi T-1006 |
| Machine Direction | | 506 | |
| Cross Direction | | 522 | |

Fire resistance tests were run on the sample at Underwriters Laboratory in Northbrook, Ill., according to the UL 790 Standard Test Methods for Fire Tests of Roof Coverings. The results of this steep slope testing are shown in Table 3:

TABLE 3

UL 790 Standard Test Methods for Fire Tests of Roof Coverings
Deck: Combustible 15/32 Inch Thick Plywood
Incline: 5/12 (5" rise in 12" horizontal)
One layer of Coating Sample B

| Test | Results |
|---|---|
| Burning Brand | Pass 4 Decks - Class A rating |
| Intermittent Flame | Pass 2 Decks - Class A rating |
| Spread of Flame | Pass 2 Decks - 0 Ft Flame Spread - Class A rating |

Table 4 shows the results of low slope fire resistance tests that were run on the sample at Underwriters Laboratory in Northbrook, Ill., according to the UL 790 Standard Test Methods for Fire Tests of Roof Coverings with a TPO membrane as the roof covering and ISO board as the insulation layer.

TABLE 4

UL 790 Standard Test Methods for Fire Tests of Roof Coverings
Deck: Combustible 15/32 Inch Thick Plywood
Incline: 1/12 (1" rise in 12" horizontal)
One layer of Coating Sample B

| Test | Roof Covering | Insulation | Results |
|---|---|---|---|
| Burning Brand | 45 mil TPO | 1.5" ISO Board | Pass 4 Decks - Class A rating |
| Intermittent Flame | 45 mil TPO | 1.5" ISO Board | Pass 1 Decks - Class A rating |
| Spread of Flame | 45 mil TPO | 3" ISO Board | Pass 2 Decks - 4.5 Ft Maximum Flame Spread - Class A rating |

A comparison of UL 790 Burning Brand test results of Sample B to gypsum board and Elk VersaShield® Underlayment (see U.S. Pat. No. 6,586,353 to Kiik) is shown in Table 5. One layer of Coating Sample B provides equivalent protection to 5/8" gypsum board and greater protection than two layers of Elk VersaShield® Underlayment.

TABLE 5

| | Gypsum board | Elk VersaShield ® Underlayment | Elk VersaShield ® Underlayment | Coating Sample B |
|---|---|---|---|---|
| Deck | 15/32" plywood | 15/32" plywood | 15/32" plywood | 15/32" plywood |
| Number of layers or thickness | 5/8" | 2 | 2 | 1 |
| Incline | 5/12 | 5/12 | 5/12 | 5/12 |
| 5/12 Burning brand Results | Class A Pass | Class A Fail | Class B Pass | Class A Pass |

A comparison of low slope UL 790 test results of Sample B to gypsum board, Georgia Pacific's Dens-Deck®, Elk VersaShield® Underlayment (see U.S. Pat. No. 6,586,353 to Kiik) and VersaShield® FB-1S (see U.S. Pat. No. 5,965,259 to Ahluwalia) is shown in Table 6. One layer of Coating Sample B provides equivalent protection to 5/8" gypsum board, or 1/4" Dens-Deck®, two layers of Elk VersaShield® Underlayment, and three layers of VersaShield® FB-1S.

TABLE 6

|  | Gypsum board | Dens-Deck® | Elk VersaShield® Underlayment | Elk VersaShield® FB-1S | Coating Sample B |
| --- | --- | --- | --- | --- | --- |
| Deck | 15/32" plywood | 15/32" plywood | 15/32" plywood | 15/32" plywood | 15/32" plywood |
| Number of layers or thickness | 5/8" | 1/4" | 2 | 3 | 1 |
| Incline | 1/12 | 1/12 | 1/12 | 1/12 | 1/12 |
| UL 790 Results | Class A Pass | Class A Pass | Class A Pass | Class A Pass | Class A Pass |

While the present invention is described herein in terms of certain preferred embodiments, those skilled in the art will recognize that various modifications and improvements may be made to the invention without departing from the scope thereof. Thus, it is intended that the present invention include modifications and variations that are within the scope of the appended claims and their equivalents. Moreover, although individual features of one embodiment of the invention may be discussed herein or shown in the drawings of one embodiment and not in other embodiments, it should be apparent that individual features of one embodiment may be combined with one or more features of another embodiment or features from a plurality of embodiments.

In addition to the specific embodiments claimed below, the invention is also directed to other embodiments having any other possible combination of the dependent features claimed below and those disclosed above. As such, the particular features presented in the dependent claims and disclosed above can be combined with each other in other manners within the scope of the invention such that the invention should be recognized as also specifically directed to other embodiments having any other possible combinations. Thus, the foregoing description of specific embodiments of the invention has been presented for purposes of illustration and description. It is not intended to be exhaustive or to limit the invention to those embodiments disclosed.

What is claimed is:

1. A fire resistant slipsheet in roll form, comprising:
a fiber mat having first and second sides; and
a coating containing expandable graphite, a filler, and a binder;
wherein the coating is bonded to at least one of the first and second sides of the fiber mat such that the coating penetrates at least one of the first and second sides of the fiber mat and wherein a single layer of the slipsheet achieves a Class A rating when tested according to UL 790 and/or ASTM E-108 Standard Test Methods for Fire Tests of Roof Coverings.

2. The fire resistant slipsheet in roll form of claim 1, wherein the expandable graphite is expandable graphite flakes.

3. The fire resistant slipsheet in roll form of claim 1, wherein the coating further includes a flame retardant.

4. The fire resistant slipsheet in roll form of claim 3, wherein the flame retardant is aluminum trihydrate.

5. The fire resistant slipsheet in roll form of claim 1, wherein the filler is selected from the group consisting of fly ash, limestone, calcium carbonate, dolomite, talc, white sand, silica, ceramic microspheres, clay, crushed rock or slag, expanded rock (clay, slate, or shale), and mixtures thereof.

6. The fire resistant slipsheet in roll form of claim 1, wherein the binder is a polymer latex binder.

7. The fire resistant slipsheet in roll form of claim 1, wherein the coating further includes at least one selected from the group consisting of a water repellent material, an anti-fungal material, an anti-bacterial material, a surface friction agent, an algaecide, a thickener, a defoamer, a pH control agent, and colored pigments.

8. The fire resistant slipsheet in roll form of claim 1, wherein the coating is bonded to both the first and second sides of the fiber mat.

9. The fire resistant slipsheet in roll form of claim 1, wherein a single layer of the slipsheet achieves a Class A rating for steep slope roofing systems when tested according to UL 790 and/or ASTM E-108 Standard Test Methods for Fire Tests of Roof Coverings.

10. The fire resistant slipsheet in roll form of claim 1, wherein a single layer of the slipsheet achieves a Class A rating for low slope roofing systems when tested according to UL 790 and/or ASTM E-108 Standard Test Methods for Fire Tests of Roof Coverings.

11. A fire resistant roofing system, comprising:
a deck;
a substantially single layer of slipsheet material covering substantially the entirety of the deck, comprising:
a fiber mat having first and second sides; and
a coating containing expandable graphite, a filler, and a binder;
wherein the coating is bonded to at least one of the first and second sides of the fiber mat such that the coating penetrates at least one of the first and second sides of the fiber mat; and
a roof covering covering substantially the entirety of the slipsheet;
wherein the roofing system achieves a Class A rating when tested according to UL 790 and/or ASTM E-108 Standard Test Methods for Fire Tests of Roof Coverings.

12. The fire resistant roofing system of claim 11, wherein the coating is coated on the first side of the fiber mat and wherein the roof covering covers the first side of the fiber mat.

13. The fire resistant roofing system of claim 11, wherein the expandable graphite is expandable graphite flakes.

14. The fire resistant roofing system of claim 11, wherein the coating further includes a flame retardant.

15. The fire resistant roofing system of claim 14, wherein the flame retardant is aluminum trihydrate.

16. The fire resistant roofing system of claim 11, wherein the filler is selected from the group consisting of fly ash, limestone, calcium carbonate, dolomite, talc, silica, ceramic microspheres, clay, crushed rock or slag, expanded rock (clay, slate, or shale), and mixtures thereof.

17. The fire resistant roofing system of claim 11, wherein the binder is a polymer latex binder.

18. The fire resistant roofing system of claim 11, wherein the coating further includes at least one selected from the group consisting of a water repellent material, an anti-fungal material, an anti-bacterial material, a surface friction agent, an algaecide, a thickener, a defoamer, a pH control agent, and colored pigments.

19. The fire resistant roofing system of claim 11, further including an insulation layer.

20. The fire resistant roofing system of claim 11, wherein the roofing system achieves a Class A rating for steep slope roofing systems when tested according to UL 790 and/or ASTM E-108 Standard Test Methods for Fire Tests of Roof Coverings.

21. The fire resistant roofing system of claim 11, wherein the roof covering is shingles.

22. The fire resistant roofing system of claim 11, wherein the roofing system achieves a Class A rating for low slope roofing systems when tested according to UL 790 and/or ASTM E-108 Standard Test Methods for Fire Tests of Roof Coverings.

23. The fire resistant roofing system of claim 11, wherein the roof covering is a single ply membrane.

24. A method for installing a fire resistant roofing system that achieves a Class A rating when tested according to UL 790 and/or ASTM E-108 Standard Test Methods for Fire Tests of Roof Coverings, comprising:
   providing a deck;
   unrolling and installing a substantially single layer of a slipsheet material over substantially the entirety of the deck, the slipsheet comprising:
      a fiber mat having first and second sides; and
      a coating containing expandable graphite, a filler, and a binder;
      wherein the coating is bonded to at least one of the first and second sides of the fiber mat such that the coating penetrates at least one of the first and second sides of the fiber mat; and
   installing a roof covering over substantially the entirety of the slipsheet.

25. The method for installing a fire resistant roofing system of claim 24, wherein the coating is bonded to the first side of the fiber mat and wherein the roof covering is installed over the first side of the fiber mat.

26. The method for installing a fire resistant roofing system of claim 24, wherein the roofing system achieves a Class A rating for steep slope roofing systems when tested according to UL 790 and/or ASTM E-108 Standard Test Methods for Fire Tests of Roof Coverings.

27. The method for installing a fire resistant roofing system of claim 24, wherein the roof covering is shingles.

28. The method for installing a fire resistant roofing system of claim 24, wherein the roofing system achieves a Class A rating for low slope roofing systems when tested according to UL 790 and/or ASTM E-108 Standard Test Methods for Fire Tests of Roof Coverings.

29. The method for installing a fire resistant roofing system of claim 24, wherein the roof covering is a single ply membrane.

30. The method for installing a fire resistant roofing system of claim 24, further including providing an insulation layer.

31. The fire resistant slipsheet in roll form of claim 1, wherein the coating is bonded to the fiber mat by chemical bonding, mechanical bonding, thermal bonding, or combinations thereof.

32. The fire resistant roofing system of claim 11, wherein the coating is bonded to the fiber mat by chemical bonding, mechanical bonding, thermal bonding, or combinations thereof.

33. The method for installing a fire resistant roofing system of claim 24, wherein the coating is bonded to the fiber mat by chemical bonding, mechanical bonding, thermal bonding, or combinations thereof.

34. The fire resistant slipsheet in roll form of claim 1, wherein the coating is coated on the fiber mat by spraying, dip coating, knife coating, roll coating, blade coating, printing, or combinations thereof.

35. The fire resistant roofing system of claim 11, wherein the coating is coated on the fiber mat by spraying, dip coating, knife coating, roll coating, blade coating, printing, or combinations thereof.

36. The method for installing a fire resistant roofing system of claim 24, wherein the coating is coated on the fiber mat by spraying, dip coating, knife coating, roll coating, blade coating, printing, or combinations thereof.

* * * * *